(12) United States Patent
Jeoti et al.

(10) Patent No.: US 10,756,783 B2
(45) Date of Patent: Aug. 25, 2020

(54) TRANS-HORIZON WIRELESS COMMUNICATION SYSTEM USING THE TROPOSPHERIC EVAPORATION DUCT

(71) Applicant: PETROLIAM NASIONAL BERHAD (PETRONAS), Kuala Lumpur, Kuala Lumpur (MY)

(72) Inventors: Varun Jeoti, Tronoh (MY); Asif Iqbal, Tronoh (MY); Khurram Shabih Zaidi, Tronoh (MY); Micheal Drieberg, Tronoh (MY); Peng Wen Wong, Tronoh (MY); M Sharif Osman, Kuala Lumpur (MY)

(73) Assignee: PETOLIAM NASIONAL BERHAD (PETRONAS), Kuala Lumpur (MY)

( * ) Notice: Subject to any disclaimer, the term of this patent is extended or adjusted under 35 U.S.C. 154(b) by 0 days.

(21) Appl. No.: 16/345,208

(22) PCT Filed: Oct. 26, 2017

(86) PCT No.: PCT/MY2017/050064
§ 371 (c)(1),
(2) Date: Apr. 25, 2019

(87) PCT Pub. No.: WO2018/080299
PCT Pub. Date: May 3, 2018

(65) Prior Publication Data
US 2019/0296801 A1    Sep. 26, 2019

(30) Foreign Application Priority Data
Oct. 26, 2016  (MY) .......................... PI 2016001909

(51) Int. Cl.
*H04B 7/02* (2018.01)
*H04B 1/7115* (2018.01)
(Continued)

(52) U.S. Cl.
CPC ........... *H04B 7/028* (2013.01); *H04B 1/7115* (2013.01); *H04B 7/024* (2013.01); *H04B 7/0413* (2013.01); *H04B 7/10* (2013.01)

(58) Field of Classification Search
CPC ...... H04B 7/028; H04B 1/7115; H04B 7/024; H04B 7/0413; H04B 7/10
See application file for complete search history.

(56) References Cited

U.S. PATENT DOCUMENTS

2011/0069778 A1*  3/2011  Kim ...................... H04L 1/0003
375/285

OTHER PUBLICATIONS

International Search Report and Written Opinion of corresponding PCT/MY2017/050064, dated Jan. 4, 2018, 9 pages.
(Continued)

*Primary Examiner* — Kabir A Timory
(74) *Attorney, Agent, or Firm* — Lewis Roca Rothgerber Christie LLP (57) ABSTRACT

A system for trans-horizon tropospheric-based wireless communication is provided. The system provides high availability and capacity as compared to a line-of-sight (LOS) standard microwave radio link while using very low height antenna towers. The system includes n×n MIMO transceiver circuitry and two or more antennas and adaptive modulation and demodulation in response to slow varying pathloss. Each of the two or more antennas is located at a vertical height above an average sea mean level within the evaporation duct. Availability percentage for different pathloss ranges along with adaptive modulation contributes to the overall availability according to the varying evaporation duct height.

16 Claims, 11 Drawing Sheets

400

(51) Int. Cl.
H04B 7/024 (2017.01)
H04B 7/0413 (2017.01)
H04B 7/10 (2017.01)

(56) References Cited

OTHER PUBLICATIONS

Zaidi, K. S. et al., 'Feasibility of Trans-Horizon, High Capacity Maritime Wireless Backhaul Communication Link', 5th International Conference on Intelligent and Advanced Systems (ICIAS) 2014, Kuala Lumpur, Malaysia, Jun. 3-5, 2014, 6 pages.

Zaidi, K. S. et al., 'High Reliability Using Virtual MIMO Based Mesh Network for Maritime Wireless Communication', 2016 6th International Conference on Intelligent and Advanced Systems (ICIAS), Kuala Lumpur, Malaysia, Aug. 15-17, 2016, 5 pages.

Kachroo, A. et al., 'Optimization of LTE Radio Resource Block Allocation for Maritime Channels', IEEE 37th Sarnoff Symposium, 2016, Sep. 19-21, 2016, Newark, NJ, USA, pp. 88-93.

Sen, S. et al., 'OFDM MIMO Radar With Mutual-Information Waveform Design for Low-Grazing Angle Tracking', IEEE Transactions on Signal Processing, pp. 3152-3162, vol. 58, No. 6, Jun. 2010.

Zaidi, K. S. et al., 'Wireless Backhaul for Broadband Communication Over Sea', 2013 IEEE 11th Malaysia International Conference on Communications, Nov. 26-28, 2013, pp. 298-303, Kuala Lumpur, Malaysia.

\* cited by examiner

FIG. 11

TRANS-HORIZON WIRELESS COMMUNICATION SYSTEM USING THE TROPOSPHERIC EVAPORATION DUCT

CROSS-REFERENCE TO RELATED APPLICATION(S)

This application is a U.S. National Phase Patent Application and claims priority to and the benefit of International Application Number PCT/MY2017/050064, filed on Oct. 26, 2017, which claims priority of Malaysian Patent Application Number PI 2016001909, filed on Oct. 26, 2016, the entire contents of all of which are incorporated herein by reference.

TECHNICAL FIELD

The present invention generally relates to methods and systems for wireless communication, and more particularly relates to methods and systems for trans-horizon wireless communication using the tropospheric evaporation duct over the sea or the ocean.

BACKGROUND OF THE DISCLOSURE

Wireless communication requires a transmitter, a receiver and a communication channel. Wireless communication beyond line-of-sight (LOS) is generally not possible over either land or sea. Over land, the communication link can be extended by repeaters and landline connections to increase the range for trans-horizon distances. Over the sea or the ocean or any large bodies of water (such as large lakes), however, such infrastructure is nonexistent due to difficulty of installations in the water. While line-of-sight based wireless communication using microwave radio can be established over the ocean, prohibitively high cost infrastructure is required in the middle of the ocean for extending trans-horizon wireless communication.

Satellite communication can facilitate such communication, however, over the sea, there are serious limitations such as high cost, data rate and traffic limitations and availability.

Recently, tropospheric-based trans-horizon wireless communication has been proposed using the evaporation duct. Some previous experiments and research in this area show promising results. However, such systems have been unable to show establishment of neither a reliable communication link nor a high data rate throughput which can match a satellite or a LOS microwave-based broadband link.

Thus, what is needed is a method and systems for trans-horizon wireless communication using the tropospheric evaporation duct which at least partially overcomes the drawbacks of present approaches and provides a communication link with very low outages and very high data rate throughput. If reliability and capacity available of such system can match the existing LOS technologies, then it can be used as an alternate wireless communication link requiring remarkably less infrastructure within the sea or the ocean. Furthermore, other desirable features and characteristics will become apparent from the subsequent detailed description and the appended claims, taken in conjunction with the accompanying drawings and this background of the disclosure.

SUMMARY

In accordance with a first aspect of the present invention, a system for a trans-horizon wireless communication link using an evaporation duct over a sea is provided. The system includes (n×n) MIMO based transceiver microwave radio circuitry, two or more antennas and adaptive modulation and demodulation circuits at both ends of the wireless communication link. The two or more antennas are vertically and/or horizontally arranged antennas and are placed within twenty-five meters above a mean sea level of the sea. The adaptive modulation and demodulation circuits are coupled at each end of the wireless communication link to the transceiver microwave radio circuitry and the two or more antennas and vary pathloss conditions to achieve high availability and/or capacity for beyond line-of-sight distances of the wireless communication link within the evaporation duct.

In accordance with a further aspect, the (n×n) MIMO system includes a (n×n) MIMO system, where n is greater than or equal to two and selected for the (n×n) MIMO system to maximize diversity gain.

In accordance with yet a further aspect, the transceiving circuitry adaptively modulates information onto transmission signals in response to varying pathloss of the transmission signals to maximize the availability and/or throughput rate of the wireless communication link.

In accordance with another aspect of the present invention, the wireless communication link includes a first over sea transceiving location at a first end of the wireless communication link and a second over sea transceiving location at a second end of the wireless communication link wherein a distance between the first over sea transceiving location and the second over sea transceiving location is beyond a line-of-sight distance. The first over sea transceiving location includes a first one of the (n×n) MIMO based transceiver microwave radio circuitry, a first set of the two or more vertically and/or horizontally arranged antennas, and a first one of the adaptive modulation and demodulation circuits. The second over sea transceiving location includes a second one of the (n×n) MIMO based transceiver microwave radio circuitry, a second set of the two or more vertically and/or horizontally arranged antennas, and a second one of the adaptive modulation and demodulation circuits.

In accordance with the present invention, the distance between the first over sea transceiving location and the second over sea transceiving location can be up to fifty kilometers or can be greater than fifty kilometers when availability and capacity can be calculated from the varying pathloss of the transmission signals within the evaporation duct.

In accordance with a further aspect, the vertical and/or horizontal separation of the two or more vertically and/or horizontally antennas at the first over sea transceiving location and the second over sea transceiving location are selected to maximize received signals to improve availability and/or capacity in both slow and fast fading environment of the evaporation duct.

In accordance with another aspect, the first one of the adaptive modulation and demodulation circuits and the second one of the adaptive modulation and demodulation circuits work together with the first and second sets of the two or more antennas to improve system performance of the trans-horizon wireless communication link to handle more pathloss than can be catered by gains from the first and second sets of the two or more antennas.

And, in accordance with yet another aspect of the present invention, the first and second ones of the adaptive modulation and demodulation circuits improve system performance by maximizing capacity for a given availability requirement in slow and fast fading conditions of the evaporation duct environment.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

FIG. 2, comprising FIGS. 2(a), 2(b) and 2(c), depicts illustrations of different types of tropospheric ducts.

Skilled artisans will appreciate that elements in the figures are illustrated for simplicity and clarity and have not necessarily been depicted to scale.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of the present embodiment to present a reliable wireless communication system for trans-horizon communication over the sea using the tropospheric evaporation duct.

Figure 1:
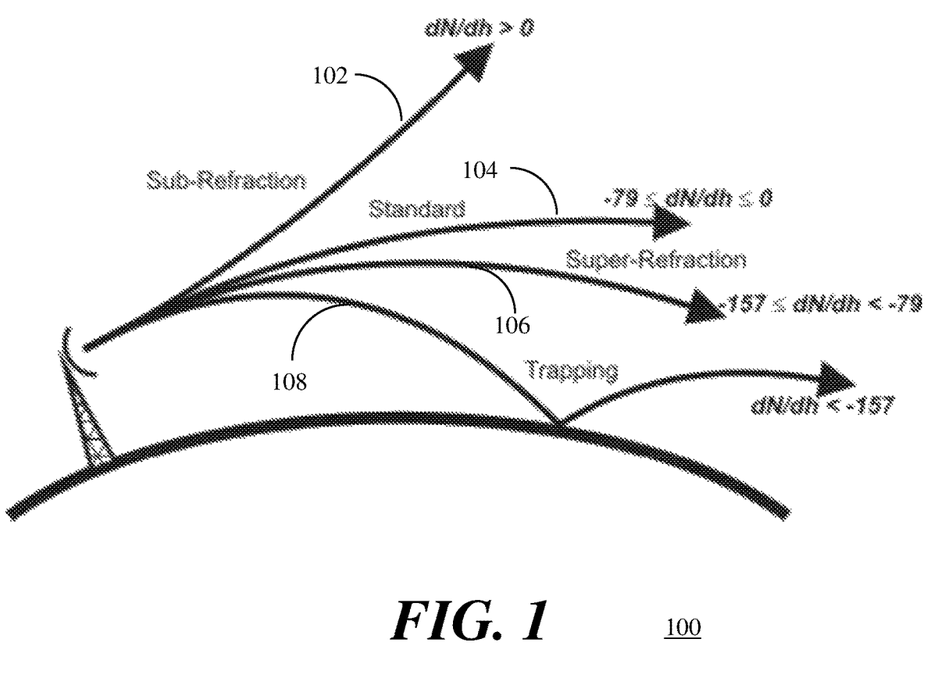
FIG. 1 depicts an illustration of radio wave under various refractive conditions.

Referring to FIG. 1, an illustration 100 depicts four refractive conditions which depend upon refractive gradients. In standard conditions 102, the gradient of refractivity varies from 0 to −79 N-units per km. When the refractivity gradient varies from −79 to −157 N-units per km, a super-refraction condition 104 occurs in the troposphere and the ray will refract downwards at a rate greater than standard but less than the curvature of earth. If the refractivity gradient is greater than 0 N-units per km, a sub refractive condition 106 exists and a radio ray will now refract upwards away from the surface of the earth. A trapping condition 108 occurs when the refractivity gradient is even less than −157 N-units per km. This will result in a ray that refracts towards the earth's surface with a curvature that exceeds the curvature of the earth.

Figure 2:
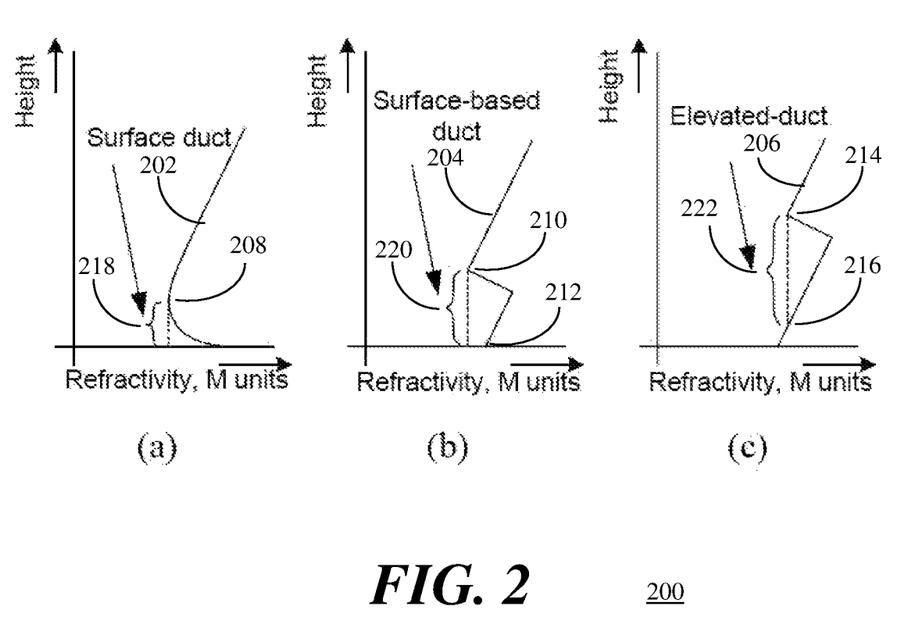

Referring to FIG. 2, illustrations 200, 210 and 220 depict well-known tropospheric ducts: a surface duct (ground-based duct) 202 (FIG. 2(a)), a surface-based duct 212 (FIG. 2(b)) and an elevated duct 222 (FIG. 2(c)). In the surface duct 202 and the surface-based duct 212, the lower boundary of the duct 204, 214 is the earth's surface, but in the elevated duct both a lower boundary 224 and an upper boundary 226 are above the earth's surface. An evaporation duct is a surface duct 202 but it is formed only over large water bodies. By virtue of the nature of their formation, evaporation ducts are nearly permanent features over the sea surface. The height of an evaporation duct 202 varies on spatial and temporal basis. The average height of an evaporation duct is reported to be approximately twenty-five meters.

Figure 3:
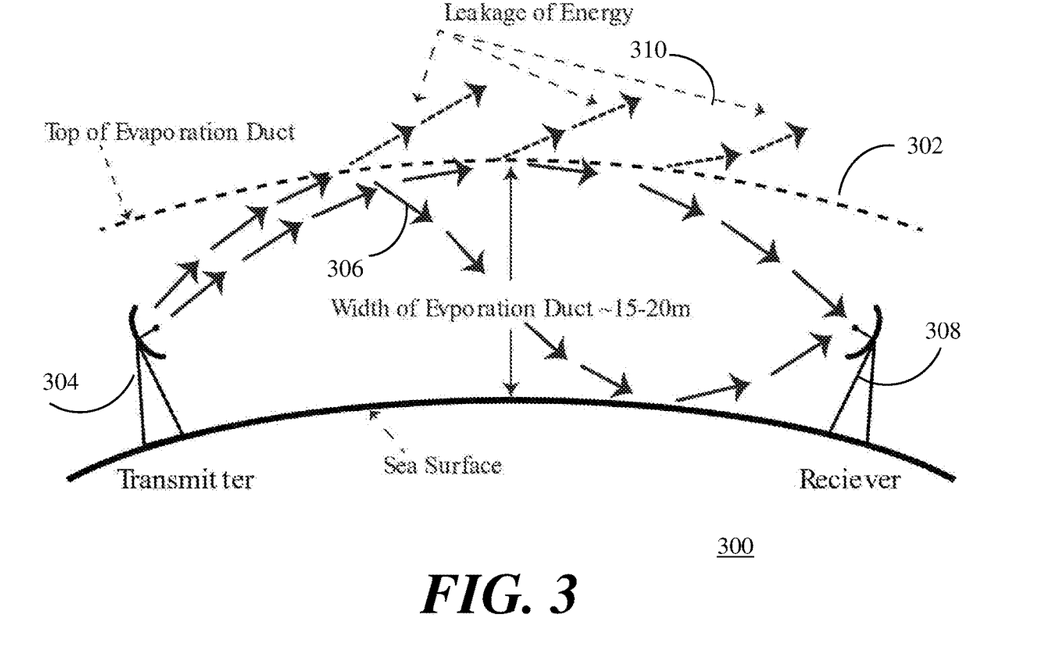
FIG. 3 depicts an illustration of tropospheric evaporation duct communication channels showing energy leakage across the evaporation duct.

In accordance with the present invention, a tropospheric wireless communication channel is established for trans-horizon communications using an evaporation duct boundary in the troposphere to reflect the signal waves. Referring to FIG. 3, an illustration 300 depicts tropospheric evaporation duct communication channels showing energy leakage across the evaporation duct 302. A transmitting antenna 304 transmits signal waves 306 across the tropospheric evaporation duct communication channels to a receiving antenna 308. As can be seen from FIG. 3, the signal waves 306 are reflected from the evaporation duct and from the sea surface. As shown in the illustration 300, there is a small amount of the leakage of energy 310, and loss due to beam divergence. These factors contribute to attenuation in the signal wave pathloss.

Figure 4:
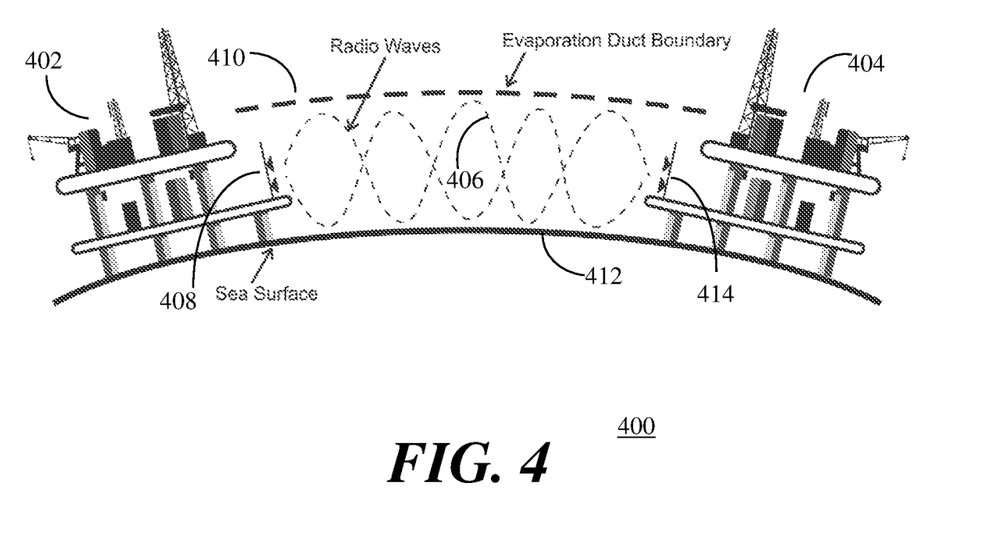
FIG. 4 depicts an illustration of the trans-horizon tropospheric evaporation duct communication system in accordance with a present embodiment.

Referring to FIG. 4 an illustration depicts a system 400 for trans-horizon tropospheric wireless communication in accordance with a present embodiment. A first over sea transceiving location 402 and a second over sea transceiving location 404 establish a communication path 406 of transmission signals between them by reflecting the transmission signals transmitted from a first set of antennas 408 off the evaporation duct boundary 410 and the sea surface 412 to a second set of antennas 414. Similarly, the signal transmitted from the second set of antennas 414 will travel between the evaporation duct boundary 410 and the sea surface 412 to reach the first set of antennas 408.

In accordance with the present embodiment, the wireless communication system 400 operates in the X-band using a pair of transceivers at the over sea transceiving locations 402, 404 capable of transmitting and receiving high-speed data beyond fifty megabits per second (Mbps) covering both line-of-site (LOS) and non-line-of-site (NLOS) (i.e., trans-horizon) distances up to fifty kilometers (km) and beyond.

Figure 5:
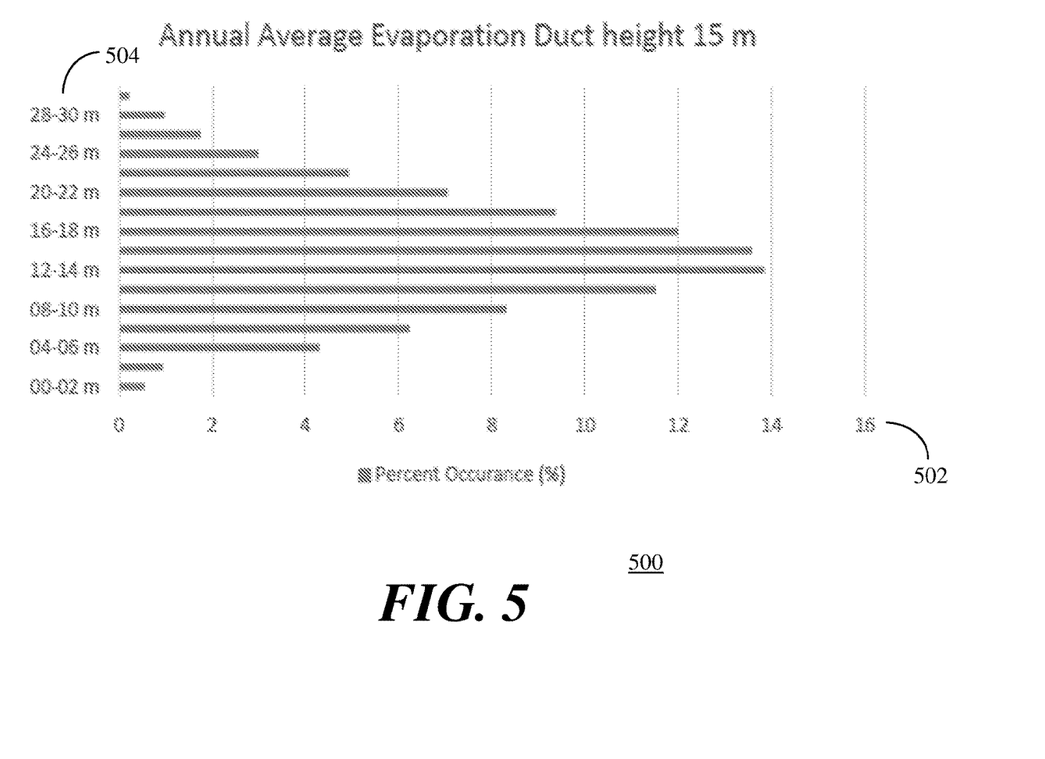
FIG. 5 depicts a graph of annual average evaporation duct height over the ocean in the Malaysian region.

In the Malaysian region of the South China Sea, the environmental parameters are very stable and do not change significantly throughout the year as compared to other non-tropical regions. Referring to FIG. 5, a bar graph 500 depicts annual average evaporation duct height over the ocean in the Malaysian region where percentage occurrence is plotted along the x-axis 502 and evaporation duct height ranges are plotted along the y-axis 504. Due to varying atmospheric conditions such as air temperature, humidity, air pressure and wind speed and varying sea conditions such as sea surface temperature, the evaporation duct height varies from two to thirty meters for 99% of the time annually and the monthly average evaporation duct height variation is from thirteen to sixteen meters within the Malaysian region of South China Sea as shown in the graph 500.

For LOS microwave system, propagation pathloss is only a function of distance (i.e., between the transmitter and the receiver) and the transmitted frequency. However, for evaporation duct propagation, pathloss is also a function of evaporation duct height. In other words, for fixed distance and frequency, the pathloss varies with respect to evaporation duct height. Generally, propagation pathloss is inversely proportional to the evaporation duct height. It is possible to compute the statistical distribution of pathloss from the percentage occurrence of evaporation duct height shown in graph 500.

Figure 6:
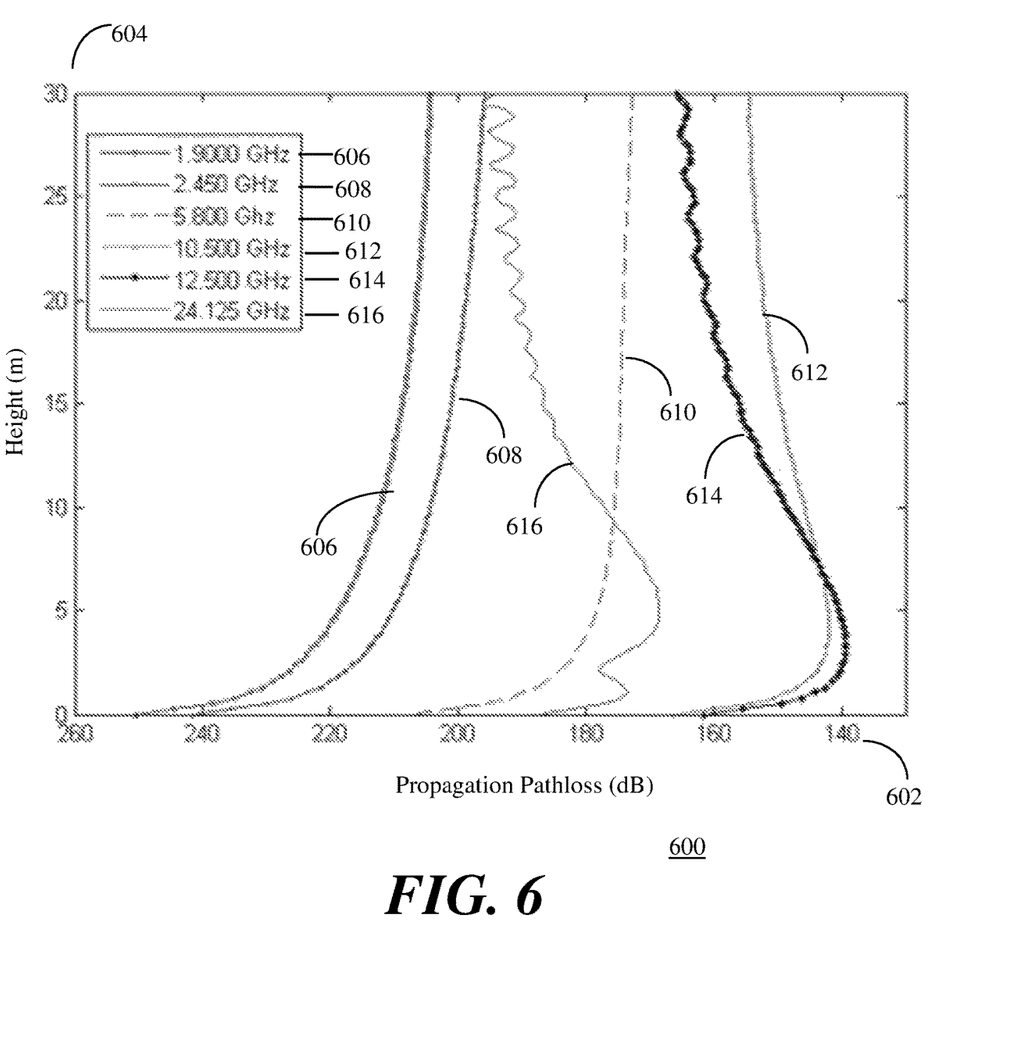
FIG. 6 depicts a graph of signal propagation pathloss at various receiver antenna heights for different transmit frequencies in accordance with the present embodiment.

Propagation pathloss can be calculated for the Malaysian region using simulation software for transmit antenna height of five meters above sea level. Transmit frequency is selected between 1.7-25 GHz with a fixed antenna beamwidth of one degree and an elevation angle of zero degrees. A horizontally polarized antenna was used for all simulations. The evaporation duct profile for the east coast of Malaysia Region is taken from Marsden square environmental data. Referring to FIG. 6, a graph 600 depicts signal propagation pathloss along the x-axis 602 at various receiver antenna heights along the y-axis 604 for a one hundred kilometer link with a range of frequencies between 1.7-25 GHz. Traces 606, 608, 610, 612, 614, 616 depict the propagation pathloss for 1.9, 2.450, 5.8, 10.5 12.5, 24.125 GHz, respectively. Traces 612 and 614 show minimum pathloss for X-band frequencies with four to five meter receiver antenna height above sea level.

Figure 7:
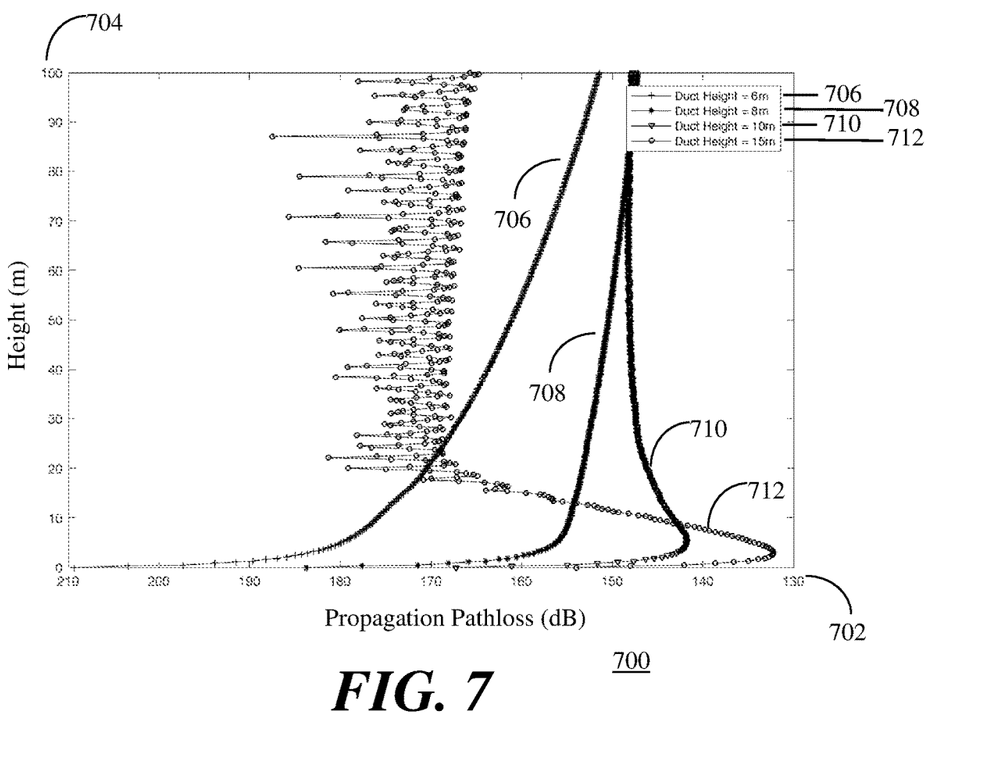
FIG. 7 depicts a graph showing the effect of evaporation duct height on the propagation pathloss of FIG. 6 in accordance with the present embodiment.

The receiver antenna height above sea level is another sensitive parameter for evaporation duct communication. Small variations in evaporation duct height can cause two types of additional path losses. First, the lower the evaporation duct height, the more attenuation in the signal thereby causing additional pathloss. Second, when the receiver antenna does not remain in the minimum range of pathloss, additional pathloss may result. Referring to FIG. 7 a graph 700 shows the propagation pathloss along the x-axis 702 versus height along the y-axis 704 for different evaporation duct heights. Traces 706, 708, 710 and 712 show that the altitude of minimum pathloss also varies below twenty-five meters for different evaporation duct heights. Unlike LOS scenario, an optimal transmit frequency and antenna height of transmitter and receiver is required for successful evaporation duct communication.

Figure 8:
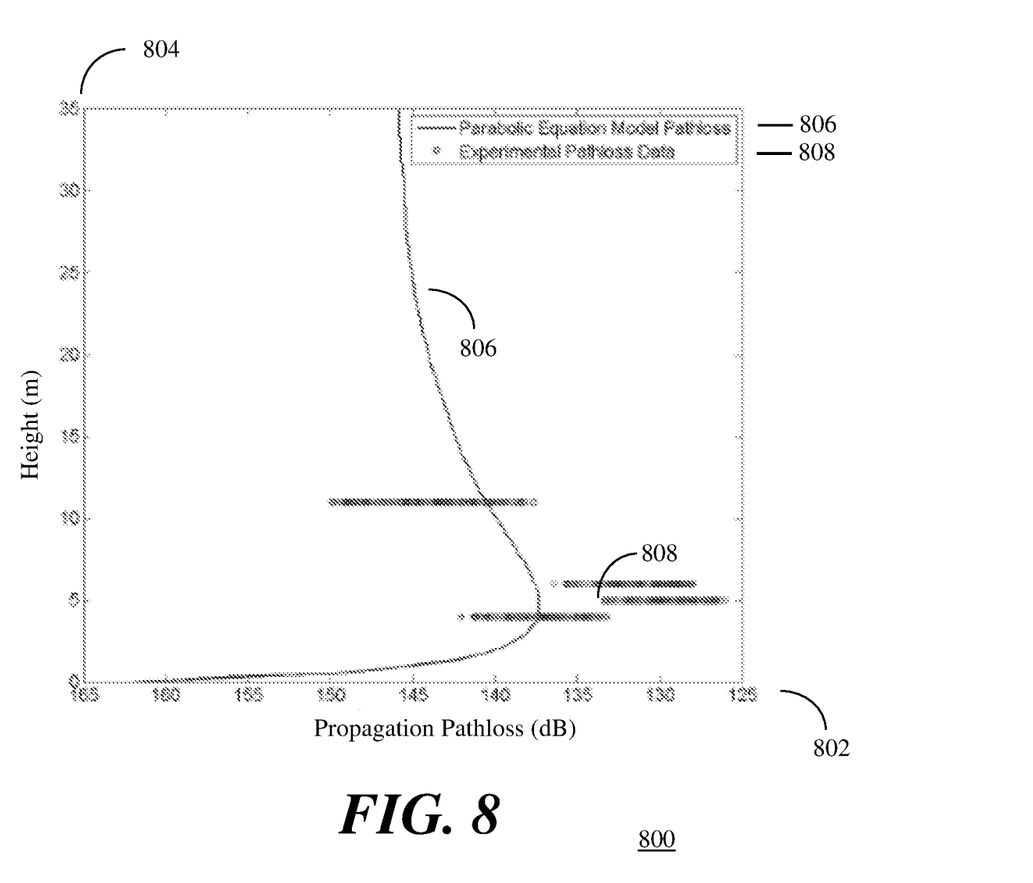
FIG. 8 depicts a graph of optimal antenna height for transceiving communication signals in accordance with modeled pathloss and experimental pathloss in accordance with the present embodiment.

The sensitivity of receiver antenna height has been validated experimentally. Referring to FIG. 8, a graph 800 depicts signal pathloss 802 versus receiver antenna height 804 within the Malaysian region of the South China Sea for 10.5 GHz with three degree beamwidth transmitter and receiver antennas. Both transmitter and receiver antennas are aligned at zero elevation angle. The separation between transmitter and receiver is fifty kilometers. The transmitter antenna is kept at a fixed height at eight meters above sea level. Trace 806 shows the simulation pathloss result for similar experiment setup. Experiment results 808 show the measured pathloss at four, five, six and ten meters above sea level receiver antenna heights. All experiment results presented here are measured at one instance. It can be observed from results 808 that five meters is the optimum receiver height for evaporation duct height at the time of experiment.

Figure 9:
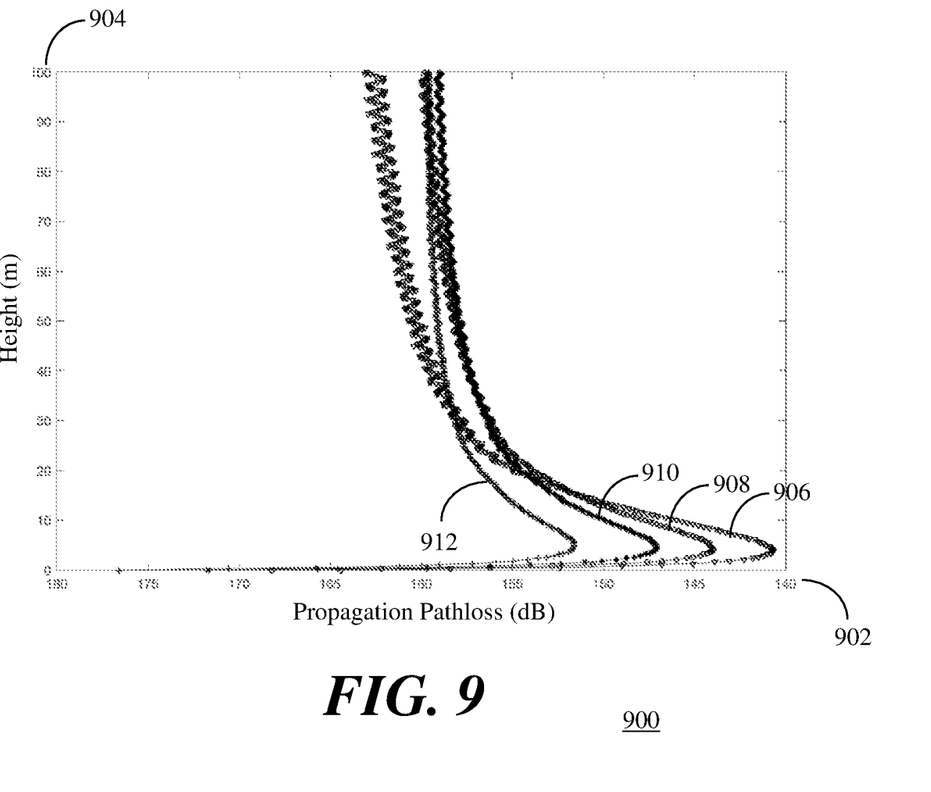
FIG. 9 depicts a graph of received signal variation due to small variations in evaporation duct properties in accordance with the present embodiment.

Referring to FIG. 9, a graph 900 shows an example of pathloss variation due to small changes in evaporation duct properties for 10.5 GHz frequency transmissions where pathloss propagation is measured along the x-axis 902 and antenna height is measured along the y-axis 904. The traces 906, 908, 910 and 912 show that for low altitude antenna heights, small changes in evaporation duct properties can cause significant pathloss variation. It can be observed from the graph 900 that the optimal receiver height is not varied too much but pathloss has significant change. The temporal variation in average propagation pathloss for fixed transmitter and receiver makes this channel very different from standard LOS scenario. Due to changes in effective propagation pathloss the available LOS digital microwave radios cannot fulfil the requirements of availability. Along with the optimization of receiver antenna height, the slow pathloss variation also needs to be compensated for better availability.

Figure 10:
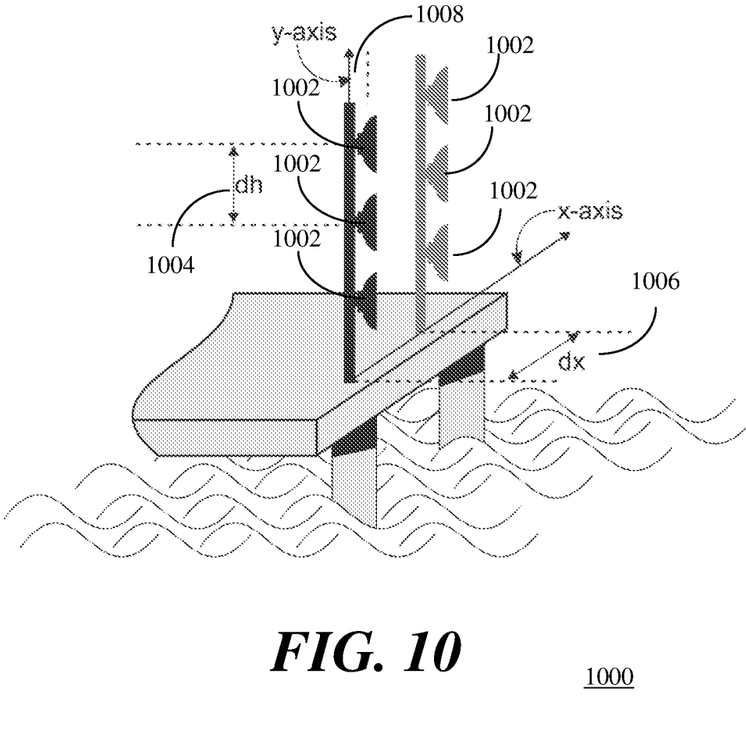
FIG. 10 depicts a two to more antenna arrangement in accordance with the present embodiment to optimize the receive signal.

As mentioned above, to receive the best signal at all the time, it is required to optimize the antenna height with respect to time. In real scenarios, the change of antenna height is not practical. In accordance with the present embodiment, a most appropriate solution is to use two or more antennas arranged vertically and/or horizontally. Referring to FIG. 10, an illustration 1000 depicts the arrangement of multiple antennas 1002 to optimize the receive signal at all times without modifying the antenna height manually. The vertical separation (dh) 1004 and horizontal separation (dx) 1006 between antennas can be defined with respect to choice of frequency and deployment scenario. As discussed earlier, the propagation pathloss in the evaporation duct varies rapidly with respect to height. Hence, in accordance with the present embodiment, most antennas must lie within the evaporation duct boundary and be arranged vertically to maximize the received signal strength.

So far, only large scale or mean pathloss behavior has been discussed in detail. There are small scale or instantaneous variations in pathloss due to many multipaths arriving at the receiver at the same time. These instantaneous variations can cause further degradation in received signal. In standard microwave radio, fade margin is used to avoid these multipath effects. Fade margin is the difference between the receiver threshold and the receive signal strength. In standard microwave signaling, fade margin is improved by either increasing the transmit power or the antenna gains. Another popular technique to improve the fade margin is to use MIMO system. In standard microwave radio, usually MIMO systems are used for fade margin improvement and also for data throughput improvement.

In summary, the evaporation duct channel is very unique and different from free space environment. Due to the dynamic nature of the evaporation duct channel, a standard LOS microwave radio system cannot provide the required availability and reliability for non-LOS use in the evaporation duct. To provide reliable communications, a communication system in accordance with the present embodiment is optimized for both slow variations in mean pathloss due to changes in the evaporation duct and the instantaneous variations due to multipath effects.

Figure 11:
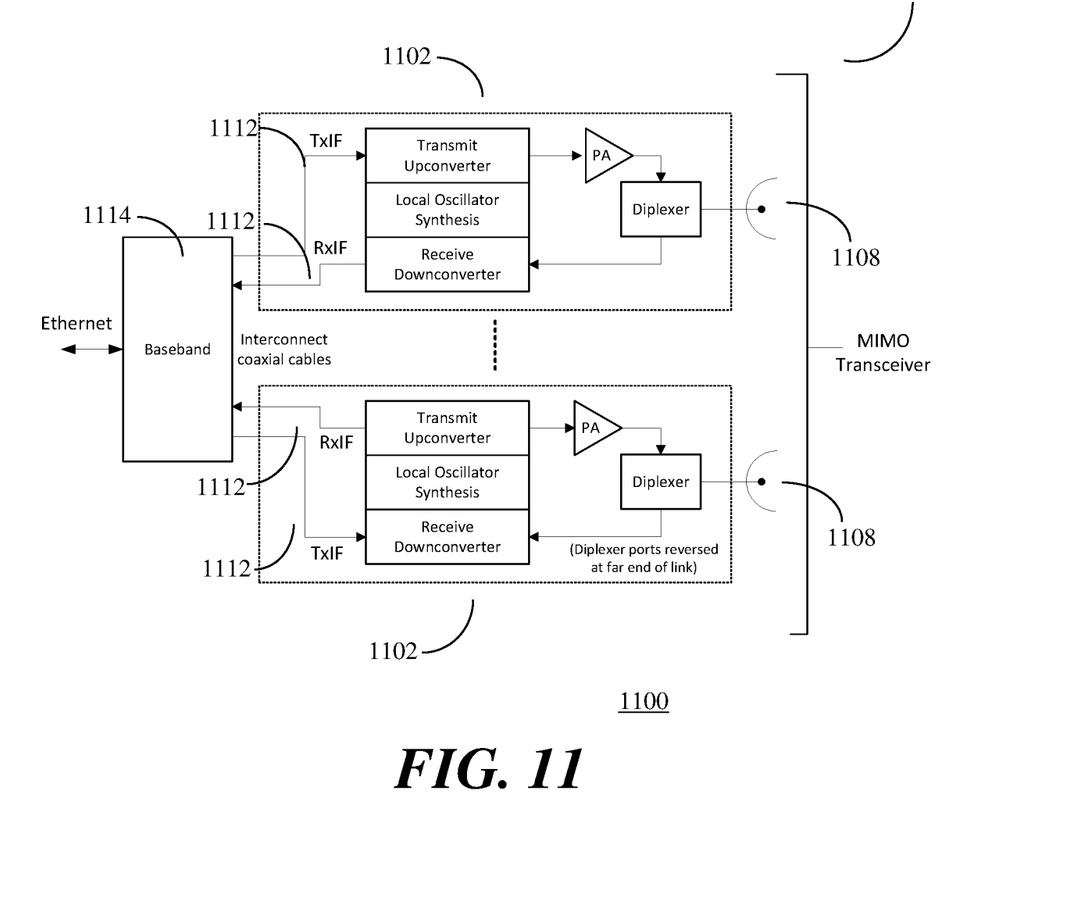
FIG. 11 depicts a block diagram of an apparatus for transceiving signals in the communication system of FIG. 4 in accordance with the present embodiment.

Referring to FIG. 11, a block diagram 1100 depicts transceiving circuitry for use at the first over sea transceiving location 402 (FIG. 4) and the second over sea transceiving location 404 in the wireless communication system 400. The transceiving circuitry includes a multiple-input, multiple-output (MIMO) system 1101 with independent 2×2 or higher order MIMO devices 1102 coupled to two or more antennas 1108. The antennas 1108 are directional and have a beamwidth ranging from one to fifty degrees, depending upon the gain required.

As discussed earlier, MIMO systems provide better performance against short term interference. They also help to improve the data throughput. In accordance with the present embodiment, the MIMO system's diversity gain provides a twofold advantage: it not only helps to mitigate instantaneous changes in pathloss, but it also helps to fulfil the requirement of optimal antenna height caused by slow variations in the evaporation duct while helping to mitigate slow variations in the mean pathloss.

The transceiver circuitry 1100 receives information for transmission from and provides received information to a baseband unit 1110 installed indoor via intermediate frequency (IF) cables 1112. Since, an objective of the present system is to improve signal availability and reliability, further improvement is accomplished by optimizing the receiver threshold. The transceiver circuitry 1101 in accordance with the present embodiment uses adaptive modulation schemes (e.g., quadrature amplitude modulation (QAM)) from 4-QAM to 256-QAM depending upon the signal-to-noise ratio (SNR) required). In accordance with the present embodiment, higher availability at all times is achieved by adopting the lower modulation scheme at higher pathloss values. The transceiver circuitry 1101 also intelligently uses Automatic Gain Control (AGC) to adjust the output transmit power in order to meet the required received power. In accordance with the present embodiment, the transceiver circuitry 1101 provides point-to-point link with 99.9% or beyond availability in both LOS and NLOS trans-horizon distances of up to fifty kilometers and beyond.

To demonstrate the performance of the present embodiment, an example case is presented. Referring to Table 1, sensitivity of receiver and margin variations according to different modulation schemes is shown with respect to average path loss, which is assumed to be 145 dB. Average Rx signal level is calculated based on fixed transmit power, antenna gains and insertion losses of radio frequency (RF) components.

TABLE 1

| System Parameters | 4-QAM | 16-QAM | 64-QAM | 128-QAM | 256-QAM |
|---|---|---|---|---|---|
| Avg. Pathloss (dB) | 145 | 145 | 145 | 145 | 145 |
| Tx Ant. Gain (dBi) | 39 | 39 | 39 | 39 | 39 |
| Rx Ant. Gain (dBi) | 39 | 39 | 39 | 39 | 39 |
| Tx Power (dBm) | 27 | 27 | 27 | 27 | 27 |
| Rx Signal Level | −40 | −40 | −40 | −40 | −40 |
| Target Eb/No (10e$^{-6}$) | 6.4 | 9.6 | 13.4 | 16.3 | 20.1 |
| Rx Sensitivity (dBm) | −91 | −84 | −78 | −74 | −72 |
| Margin (dB) | 51 | 44 | 38 | 34 | 32 |

Similarly, Table 2 shows the required fade margin for SISO, 2×2, and 4×4 MIMO based links to achieve certain availability. The required fade margin in the case of MIMO is much less as compared to the SISO based link. Fade margin is the difference between the average Rx signal power and the minimum average Rx signal power threshold value.

TABLE 2

| Availability | Required Fade Margin (SISO) | Required Fade Margin (2x2 MIMO) | Required Fade Margin (4x4 MIMO) |
|---|---|---|---|
| 0.99 | 20.0 | 10 | 5 |
| 0.995 | 23 | 12 | 7 |
| 0.999 | 30 | 15 | 8 |
| 0.9995 | 33 | 16 | 10 |
| 0.9999 | 40 | 20 | 12 |

As mentioned above, the present embodiment includes 2×2 or higher order MIMO devices 1102. Another example case is presented to demonstrate the availability of radio link for Single input single output (SISO) configurations versus MMO configurations. It is assumed the pathloss is equally likely between 190 dB to 140 dB. Row 8 in Table 3 depicts the range of pathloss in dB. The pathloss is divided into five equal 10 dB sections. It is assumed there are different modulations for each section. For higher pathloss, the lower the modulation scheme and pathloss, the higher the modulation order. This average pathloss value is then used to calculate the average margin. The required fade margin for a SISO based link is calculated in decibels, for required availability using Equation (1). As shown in Table 3, a single-input single-output (SISO) based link budget calculation provides 96.74% annual availability based on fade margins shown in Table 2.

$$Fd=-10\log[-\ln(1-Po)], \qquad (1)$$

where, Fd is the fade margin and Po is the outage probability.

In accordance with the present embodiment, multiple antennas 1108 with MIMO devices 1102 can be used to combat multipath fading and slow variation of pathloss in the evaporation duct. In this example, the performance improvement using 2×2 and 4×4 MIMO is shown in Table 3. It can be seen that using MIMO systems considerably decreases the required fade margin as compared to a SISO system. The fade margin required is shown in Table 2. Thus, as the pathloss increases, the wireless communication system in accordance with the present embodiment shifts to a lower modulation scheme in order to reduce the pathloss margin. Even with the lowest average margin for 2×2 MIMO, the availability can be achieved more than 99% and the overall availability for a MIMO system is greater than 99.7% as calculated in Table 3. If we move to the higher order of MIMO, annual availability can be improved to 99.9% and beyond.

TABLE 3

| SISO vs MIMO Annual Availability | | | | | |
|---|---|---|---|---|---|
| Modulation | 4-QAM | 16-QAM | 64-QAM | 128-QAM | 256-QAM |
| Tx Power (dBm) | 27 | 27 | 27 | 27 | 27 |
| Tx Ant. Gain (dBi) | 39 | 39 | 39 | 39 | 39 |
| Rx Ant. Gain (dBi) | 39 | 39 | 39 | 39 | 39 |
| Target Eb/No | 6.4 | 9.6 | 13.4 | 16.3 | 20.1 |
| Rx Sensitivity | −91 | −84 | −78 | −74 | −72 |

TABLE 3-continued

| SISO vs MIMO Annual Availability | | | | | |
|---|---|---|---|---|---|
| Modulation | 4-QAM | 16-QAM | 64-QAM | 128-QAM | 256-QAM |
| Pathloss (dB) | 190-181 | 180-171 | 170-161 | 160-151 | 150-140 |
| Average Pathloss (dB) | 185.5 | 175.5 | 165.5 | 155.5 | 145 |
| Average Pr (dBm) | −80.5 | −70.5 | −60.5 | −50.5 | −40 |
| Margin (dB) | 10.5 | 13.5 | 17.5 | 23.5 | 32 |
| SISO Availability | 0.9061 | 0.9540 | 0.9820 | 0.9955 | 0.9994 |
| Avg. Availability % | | | 96.74 | | |
| 2x2 MIMO Availability | 0.9910 | 0.9960 | 0.9996 | 0.9999 | 0.9999 |
| Avg. Availability % | | | 99.73 | | |
| 4x4 MIMO Availability | 0.9995 | 0.9999 | 0.9999 | 0.9999 | 0.9999 |
| Avg. Availability % | | | 99.98 | | |

The average link capacity is shown in Table 4. Under the assumption of equally likely pathloss from 145 to 190 dB, we obtain the capacity for each of these pathloss range based on the average power. Since, capacity is a function of modulation order, due to slow fading variation, capacity can be independently calculated for each modulation with respect to the pathloss range given in Table 3. The overall average total will remain above 61 Mbps.

TABLE 4

| 2x2 MIMO Average link capacity | | | | | |
|---|---|---|---|---|---|
| Modulation | 4-QAM | 16-QAM | 64-QAM | 128-QAM | 256-QAM |
| Capacity Mbps | 22.28 | 46 | 68 | 80 | 91 |
| Avg. Capacity (Mbps) | | | 61.45 | | |

Thus, it can be seen that the present embodiment can provide an improved system for trans-horizon wireless communication using the tropospheric evaporation duct which at least partially overcomes the drawbacks of present approaches and provides a communication and high data rate throughput. The present embodiment provides a novel trans-horizon wireless communication system optimized in accordance with various environmental conditions which is capable of adapting to variations in communication channel pathloss.

While exemplary embodiments have been presented in the foregoing detailed description of the invention, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of steps and method of operation described in the exemplary embodiment without departing from the scope of the invention as set forth in the appended claims.

What is claimed is:

1. A system for a trans-horizon wireless communication link using an evaporation duct over a sea comprising:
   (n×n) MIMO based transceiver microwave radio circuitry at both ends of the wireless communication link for transmitting and receiving radio signals at a predetermined frequency;
   two or more antennas arranged at each end of the wireless communication link within the evaporation duct, wherein the two or more antennas are vertically and/or horizontally arranged antennas at said each end of the wireless communication link for establishing the trans-horizon wireless communication link by reflecting radio signals off the evaporation duct and off a surface of the sea, and wherein the two or more antennas are placed within twenty-five meters above a mean sea level of the sea and at an antenna height predetermined in response to the predetermined frequency; and
   adaptive modulation and demodulation circuits coupled at said each end of the wireless communication link to the transceiver microwave radio circuitry and the two or more antennas for varying pathloss conditions of the radio signals to achieve high availability and/or capacity for beyond line-of-sight distances of the wireless communication link within the evaporation duct.

2. The system in accordance with claim 1 wherein the evaporation duct is caused by atmospheric conditions that comprise air temperature, humidity, air pressure and wind speed.

3. The system in accordance with claim 1 wherein the (n×n) MIMO based transceiver microwave radio circuitry comprises a (n×n) MIMO system, where n is greater than or equal to two and selected for the (n×n) MIMO system to maximize diversity gain.

4. The system in accordance with Claim 1 wherein the transceiver microwave radio circuitry adaptively modulates information onto transmission signals in response to varying pathloss of the transmission signals to maximize the availability and/or throughput rate of the wireless communication link.

5. The system in accordance with Claim 1 wherein the wireless communication link comprises:
   a first over sea transceiving location at a first end of the wireless communication link comprising a first one of the (n×n) MIMO based transceiver microwave radio circuitry, a first set of the two or more vertically and/or horizontally arranged antennas, and a first one of the adaptive modulation and demodulation circuits; and
   a second over sea transceiving location at a second end of the wireless communication link comprising a second one of the (n×n) MIMO based transceiver microwave radio circuitry, a second set of the two or more vertically and/or horizontally arranged antennas, and a second one of the adaptive modulation and demodulation circuits, and wherein a distance between the first over sea transceiving location and the second over sea transceiving location is beyond a line-of-sight distance.

6. The system in accordance with claim 5 wherein the distance between the first over sea transceiving location and the second over sea transceiving location is less than or equal to fifty kilometers.

7. The system in accordance with claim 5 wherein the distance between the first over sea transceiving location and the second over sea transceiving location is greater than fifty kilometers when availability and capacity can be calculated from the varying pathloss of the transmission signals within the evaporation duct.

8. The system in accordance with claim 5, wherein vertical and/or horizontal separation of the first set of two or more vertically and/or horizontally arranged antennas at the first over sea transceiving location and the second set of two or more vertically and/or horizontally arranged antennas at the second over sea transceiving location are selected to maximize received signals to improve availability and/or capacity in both slow and fast fading environment of the evaporation duct.

9. The system in accordance with claim 5, wherein the first one of the adaptive modulation and demodulation circuits and the second one of the adaptive modulation and demodulation circuits work together with the first and second sets of the two or more antennas to improve system performance of the trans-horizon wireless communication link to handle more pathloss than can be catered by gains from the first and second sets of the two or more antennas.

10. The system in accordance with claim 9, wherein the first and second ones of the adaptive modulation and demodulation circuits improve system performance by maximizing capacity for a given availability requirement in slow and fast fading conditions of the evaporation duct environment.

11. The system in accordance with claim 8, wherein the first set of two or more vertically and/or horizontally arranged antennas and the second set of two or more vertically and/or horizontally arranged antennas are placed two to nine meters above the mean sea level of the sea for a path loss of less than 140 dB.

12. The system in accordance with claim 8, wherein the first set of two or more vertically and/or horizontally arranged antennas and the second set of two or more vertically and/or horizontally arranged antennas are placed four to five meters above the mean sea level of the sea.

13. The system in accordance with claim 8, wherein the first set of two or more vertically and/or horizontally arranged antennas and the second set of two or more vertically and/or horizontally arranged antennas each comprises at least two horizontally arranged antennas, wherein a horizontal displacement between the at least two horizontally arranged antennas is predetermined in response to the predetermined frequency.

14. The system in accordance with claim 1 wherein the two or more antennas comprise directional antennas.

15. The system in accordance with claim 1 wherein the two or more antennas comprise antennas having a beamwidth ranging from one to fifty degrees.

16. The system in accordance with claim 10, wherein the first and second ones of the adaptive modulation and demodulation circuits use quadrature modulation (QAM) from 4-QAM to 256-QAM, wherein the quadrature modulation is selected in response to a desired signal-to-noise ratio (SNR).

\* \* \* \* \*